United States Patent
Wang et al.

(10) Patent No.: US 7,724,406 B2
(45) Date of Patent: May 25, 2010

(54) HALFTONE INDEPENDENT COLOR DRIFT CORRECTION

(75) Inventors: Shen-ge Wang, Fairport, NY (US); Raja Bala, Webster, NY (US); Vishal Monga, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1119 days.

(21) Appl. No.: 11/343,656

(22) Filed: Jan. 31, 2006

(65) Prior Publication Data

US 2007/0177231 A1     Aug. 2, 2007

(51) Int. Cl.
    *H04N 1/60*     (2006.01)
(52) U.S. Cl. ...................... 358/504; 358/1.9; 358/3.06
(58) Field of Classification Search ............ 358/504, 358/1.9, 3.06
    See application file for complete search history.

(56) References Cited

U.S. PATENT DOCUMENTS

| | | | |
|---|---|---|---|
| 5,469,267 A | 11/1995 | Wang | |
| 5,748,330 A | 5/1998 | Wang et al. | |
| 5,749,020 A | 5/1998 | Mestha et al. | |
| 5,854,882 A | 12/1998 | Wang | |
| 6,266,157 B1 | 7/2001 | Fan et al. | |
| 6,435,654 B1 | 8/2002 | Wang et al. | |
| 6,694,109 B1 * | 2/2004 | Donaldson et al. | 399/49 |
| 6,744,531 B1 | 6/2004 | Mestha et al. | |
| 6,775,029 B1 | 8/2004 | Wen et al. | |
| 2002/0085235 A1 * | 7/2002 | Degani et al. | 358/3.06 |
| 2004/0012817 A1 | 1/2004 | Brewington et al. | |
| 2004/0150858 A1 | 8/2004 | Cholewo et al. | |

FOREIGN PATENT DOCUMENTS

| | | |
|---|---|---|
| EP | 0 398 502 | 11/1990 |
| EP | 398502 A2 * | 11/1990 |
| EP | 1 152 598 | 11/2001 |
| EP | 1 365 576 | 11/2003 |

OTHER PUBLICATIONS

Wang, Shen-ge, *Two-by-Two Centering Printer Model with Yule-Nielsen Equation*, IS&T's NIP 14, International Conference on Digital Printing Technologies, Oct. 1998; p. 302-305; ISBN / ISSN: 0-89208-212-7.

Sharma, Gaurav, *Digital Color Imaging Handbook*, 2003, Chapter 5, p. 269-379; ISBN: 0-8493-0900-X.

European Search Report for Application No. EP 07 10 1060.

* cited by examiner

*Primary Examiner*—King Y Poon
*Assistant Examiner*—Jamares Washington
(74) *Attorney, Agent, or Firm*—Fay Sharpe LLP

(57) ABSTRACT

A method for compensating for color drift in a printer includes determining a first true tone response curve for a color channel when said printer is in a first state. A first estimated tone response curve for the color channel is also determined when said printer is in the first state. A second estimated tone response curve for the color channel is determined when the printer is in a second, color-drifted state relative to the first state. A second true tone response curve for the color channel is mathematically predicted using the first true tone response curve, the first estimated tone response curve, and the second estimated tone response curve. The first and second estimated tone response curves are estimated using a 2×2 printer model. A printing apparatus includes an image processing unit for implementing the color-drift correction process.

18 Claims, 10 Drawing Sheets

HALFTONE INDEPENDENT COLOR DRIFT CORRECTION

BACKGROUND

Almost all printers are subject to temporal color drift, i.e., color printed at time T1 is different from the color printed at a different time T2, for a given digital color input value. To maintain consistent color output from day to day or over other periods of time, it is necessary to monitor the printer output and apply corresponding color adjustments to the digital inputs sent to the printer. A similar problem is color drift across printing media, i.e., where a particular digital color input value to a printer results in different color printed output depending upon the style, color, quality, finish, etc. of the paper or other recording media upon which the ink/toner is deposited. These color drift problems are illustrated graphically in FIG. 1, wherein it can be seen that digital image data input to a printer results in printed output that varies from a time T1 to a time T2 and that varies from media (e.g., paper) M1 to media (e.g., paper) M2.

Full color characterization can be performed as needed to correct for temporal color drift or media color drift, as described, e.g., in R. Bala, "Device Characterization," Digital Color Imaging Handbook, Chapter 5, CRC Press, 2003. This is a time consuming operation that is preferably avoided in most xerographic printing environments. Simpler color correction methods based on 1-dimensional (1-D) tone response curve (TRC) calibration for each of the individual color channels are usually sufficient and are easier to implement. The 1-D TRC calibration approach is also well-suited for use of in-line color measurement sensors, but is typically halftone dependent. In general, for each color channel C and for each halftone method H, a series of test patches are printed in response to N different digital input levels which requires C×H×N test patches, because the test patches must be printed for each halftone method. It has been found in practice that N must not be too small (e.g., N=16 is usually too small) because the TRC for each halftone method is typically not a smooth curve, due to dot overlapping and other microscopic geometries of the printer physical output. Existing methods for 1-D calibration, being halftone dependent, are measurement-intensive, and are not practical for in-line calibration, especially in print engines equipped with multiple halftone screens.

Previously, Wang and others have proposed a halftone independent printer model for calibrating black-and-white and color printers. This halftone independent printer model is referred to as the two-by-two (2×2) printer model and is described, e.g., in the following U.S. patents, all of which are hereby expressly incorporated by reference into this specification: U.S. Pat. Nos. 5,469,267, 5,748,330, 5,854,882, 6,266,157 and 6,435,654. The 2×2 printer model is also described in the following document that is also hereby expressly incorporated by reference into this specification: S. Wang, "Two-by-Two Centering Printer Model with Yule-Nielsen Equation," Proc. IS&T NIP14, 1998.

The 2×2 printer model is explained briefly with reference to FIGS. 2A, 2B and 2C (note that in FIGS. 2A, 2B, 2C the grid pattern is shown for reference only). FIG. 2A illustrates an ideal example of a halftone printer output pattern IHP, where none of the ink/toner dots ID overlap each other (any halftone pattern can be used and the one shown is a single example only); practical printers are incapable of generating non-overlapping square dots as shown in FIG. 2A. A more realistic dot overlap model is the circular dot model shown in FIG. 2B for the pattern HP (the halftone pattern HP of FIG. 2B corresponds to the halftone pattern IHP of FIG. 2A). These overlapping dots D in combination with optical scattering in the paper medium create many difficulties in modeling a black-and-white printer (or a monochromatic channel of a color printer). In a conventional approach such as shown in FIG. 2B, the output pixel locations are defined by the rectangular spaces L of the conceptual grid pattern G and are deemed to have centers coincident with the centers of the dots output D (or not output) by the printer. Because the grid G is conceptual only, according to the 2×2 printer model, the grid G can be shifted as shown in FIG. 2C and indicated at G' so that the printer output dots D' of the pattern HP' are centered at a cross-point of the grid G' rather than in the spaces L'. Although the halftone dot patterns HP,HP' of FIGS. 2B and 2C are identical, overlapping details within the rectangular spaces L' of the grid of FIG. 2C are completely different as compared to FIG. 2B. More particularly, there are only $2^4=16$ different overlapping dot patterns for the 2×2 model shown in FIG. 2C, while there are $2^9=512$ different overlapping dot patterns in a conventional circular dot model as shown in FIG. 2B.

The 16 different overlapping dot patterns of FIG. 2C can be grouped into seven categories G0-G6 as shown in FIG. 2D, i.e., each of the 16 possible different overlapping dot patterns of a pixel location L' associated with the model of FIG. 2C can be represented by one of the seven patterns G0-G6 of FIG. 2D. The patterns G0 and G6 represent solid white and solid black (or other monochrome color), respectively. The pattern G1 is one of four different equivalent overlapping patterns that are mirror image of each other, as is the pattern G5. Each of the patterns G2, G3, G4 represents one of two different mirror-image overlapping patterns. Therefore, in terms of ink/toner color coverage (gray level), all pixels (located in the rectangular spaces L' of the conceptual grid pattern G) of each of the seven patterns G0-G6 are identical within a particular pattern G0-G6. In other words, each pattern G0-G6 consists of only one gray level at the pixel level L', and this gray level can be measured exactly.

The test patches G0'-G6' shown in FIG. 2E illustrate an example of one possible real-world embodiment for printing the seven patterns G0-G6. The present development is described herein with reference to printing and measuring the color of the test patches G0'-G6', and those of ordinary skill in the art will recognize that this is intended to encompass printing and measuring the color of any other test patches that respectively represent the patterns G0-G6 in order to satisfy the 2×2 printer model as described herein. It is not intended that the present development, as disclosed below, be limited to use of the particular test patches G0'-G6' or any other embodiment of the 2×2 patterns G0-G6. In general, for the 2×2 printer model to hold, the shape of the dots D' must be symmetric in the x (width) and y (height) directions, and each dot D' should be no larger than the size of two output pixel locations L' in both the x and y directions. The dots D' need not be circular as shown.

The 2×2 printer model as just described can be used to predict the gray level of any binary (halftone) pattern, because any binary pattern such as the halftone pattern of FIG. 2C can be modeled as a combination of the seven patterns G0-G6, each of which has a measurable gray level as just described. In other words, once the seven test patches G0'-G6' are printed and the gray (color) level of each is measured, the gray level of any binary pattern can be predicted mathematically and without any additional color measurements. For example, the halftone pattern of FIG. 2C is shown in FIG. 3, along with its corresponding 2×2 based model M, wherein each of the output pixels of the halftone pattern HP' (conceptually located in a rectangular space L' of the grid) is represented by one of the seven 2×2 patterns G0-G6 that has a corresponding color output pattern/coverage for its pixels. Thus, for example, for the pixel $P_{00}$ of the binary pattern HP', the 2×2 pattern G1 has pixels with corresponding color coverage (as indicated at $P_{00}$', while for the pixel $P_{50}$, the 2×2 pattern G3 has pixels with corresponding color coverage as shown at $P_{50}$', and for the pixel $P_{66}$ there is no color which corresponds to the pattern G0 as indicated at $P_{66}$' of the model M. As such, any binary pattern of pixels can be modeled as a combination of the 2×2 patterns G0-G6 by selecting, for each pixel of the binary pattern, the one of the 2×2 patterns G0-G6 that is defined by pixels having color coverage the equals the color coverage of the pixel in question.

When a binary pattern HP' is represented by a model M comprising a plurality of the patterns G0-G6, the gray level output of the binary pattern HP' can be estimated mathematically, e.g., using the Neugebauer equation with the Yule-Nielsen modification, as follows:

$$G_{AVG}^{1/\gamma} = \sum_{i=0}^{6} n_i G_i^{1/\gamma}$$

where $G_i$, i=0 to 6 is the measured gray level of the respective 2×2 patterns G0-G6, $n_i$ is the number of pixels of the corresponding 2×2 pattern in the binary pattern, and $\gamma$ is the Yule-Nielsen factor, a parameter which is often chosen to optimize the fit of the model to selected measurements of halftone patches. Details of such an optimization are given in R. Bala, "Device Characterization," Digital Color Imaging Handbook, Chapter 5, CRC Press, 2003. For example, the average gray level of the binary pattern of FIG. 2B/FIG. 2C can be estimated as:

$$G_{AVG} = (7G_0^{1/\gamma} + 25G_1^{1/\gamma} + 7G_2^{1/\gamma} + 3G_3^{1/\gamma} + 3G_4^{1/\gamma} + 3G_5^{1/\gamma} + G_6^{1/\gamma})^{\gamma}$$

The color 2×2 printer model can be described in a similar manner. The color 2×2 printer model can predict the color appearance of binary patterns for a given color printer and the color accuracy of the prediction is high for printers with relatively uniform dot shapes, such as inkjet printers. However, xerographic printers usually do not generate uniform round-shape dots for isolated single pixels and the dot overlapping is more complicated as compared to inkjet dot output. As such, the color 2×2 printer model applied to a xerographic printer will typically yield larger prediction errors.

SUMMARY

In accordance with a first aspect of the present development, a method for compensating for color drift in a printer comprises, for each color channel: determining a first true tone response curve for a color channel when the printer is in a first state; determining a first estimated tone response curve for the color channel when the printer is in the first state; determining a second estimated tone response curve for the color channel when the printer is in a second, color-drifted state relative to the first state; mathematically predicting a second true tone response curve for the color channel using the first true tone response curve, the first estimated tone response curve, and the second estimated tone response curve.

In accordance with a second aspect of the present development, a xerographic printing apparatus comprises: an image processing unit adapted to receive image data from a source; a printing unit comprising a print engine for printing the image data to define a printed image; a color sensor for detecting a color of the printed image printed by the print engine, the color sensor operably connected to the image processing unit to input the color of the printed image to the image processing unit; and a printed output station for output of the printed image. The image processing unit comprises means for compensating for color drift in the printing apparatus when the printing apparatus changes from a first state to a second state. The means for compensating for color drift comprises: means for determining a first true tone response curve for a color channel of the printing apparatus when the printing apparatus is in the first state; means for determining a first estimated tone response curve for the color channel when the printing apparatus is in the first state; means for determining a second estimated tone response curve for the color channel when the printing apparatus is in the second state; means for calculating a predicted second true tone response curve for the color channel using the first true tone response curve, the first estimated tone response curve, and the second estimated tone response curve.

In accordance with another aspect of the present development, a method for color drift correction in a printing device comprises: determining a true tone response curve for at least one color channel for a first state of said printing device; printing a first plurality of test patches using the at least one color channel when the printer is in said first state; measuring a first color output for each of the first plurality of test patches; deriving a first plurality of different binary output patterns corresponding respectively to a first plurality of different digital input color levels; for each of the first plurality of binary output patterns, deriving a first model comprising a combination of test patches selected from the first plurality of test patches; for each first model, calculating an average color output based upon the measured first color output for the test patches from the first plurality of test patches included in the first model; using the average output color calculated for each of the first models to derive a first estimated tone response curve for the at least one color channel; printing a second plurality of test patches using the at least one color channel when the printer is in a second state that is different from the first state; measuring a second color output for each of the second plurality of test patches; deriving a second plurality of different binary output patterns corresponding respectively to a second plurality of different digital input color levels; for each of the second plurality of binary output patterns, deriving a second model comprising a combination of test patches selected from the second plurality of test patches; for each second model, calculating an average color output based upon the measured color output for the test patches of the second plurality of test patches included in the second model; using the average output color calculated for each of the second models to derive a second estimated tone response curve for the at least one color channel; deriving a second true tone response curve for the at least one color channel using the first and second estimated tone response curves and the first true tone response curve.

BRIEF DESCRIPTION OF THE DRAWINGS

The development comprises various processes and/or structures and arrangements of same, preferred embodiments of which are illustrated in the accompanying drawings wherein.

DETAILED DESCRIPTION

In accordance with the present development, the monochrome 2×2 printer model is used to correct for color drift resulting over time (temporal color drift) or resulting from a change in paper or other printing medium (media color drift) or other color drift problems. To simplify the following disclosure, the discussion of color drift is referenced with respect to a first state of the printer (e.g., at a first time T1 or using a first paper or other printing medium M1) relative to a second state of the printer (e.g., at a second time T2 after the first time T1 or using a second paper or other printing medium M2 that is different from the first printing medium M1).

Although the 2×2 printer model is typically not sufficient to provide a full printer characterization, the measurement of 2×2 patches along the individual colorant channels can provide a satisfactory indication of printer color drift. Because the 2×2 patches are binary, i.e., not tied to any particular halftone method, this property can be exploited to provide a halftone independent color drift correction method. In accordance with the present development, however, the monochrome 2×2 model is used to predict color drift in each color channel, which is then used together with one or more known tone response curves (TRCs) respectively associated with one or more color channels (one possible color channel is black for black-and-white printing) for a first state of the printer, to predict corresponding new TRCs for the one or more color channels for a second state of the printer.

Figure 1:
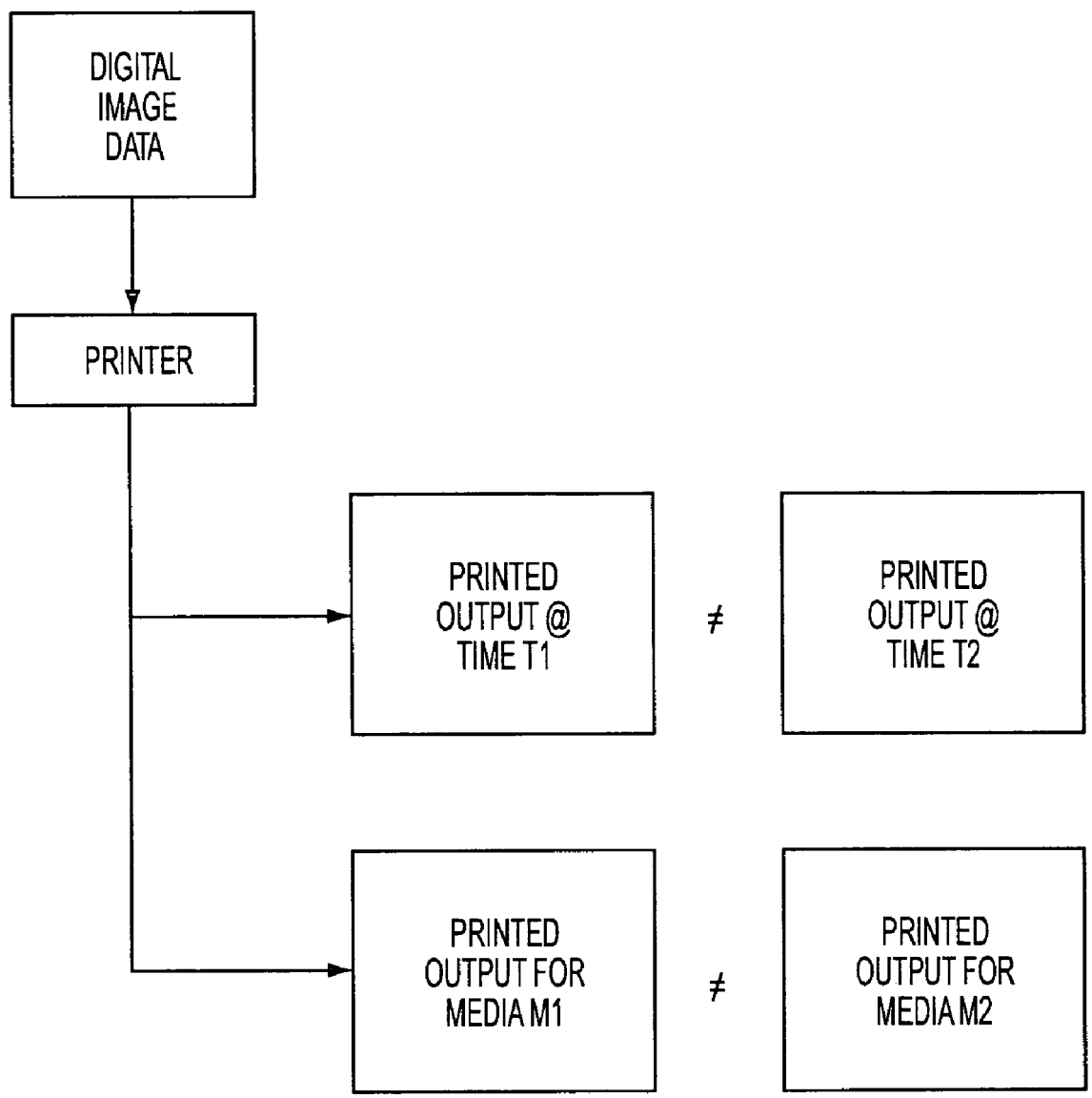
FIG. 1 diagrammatically illustrates the problems of temporal color drift and color drift across media.
Figure 2A:
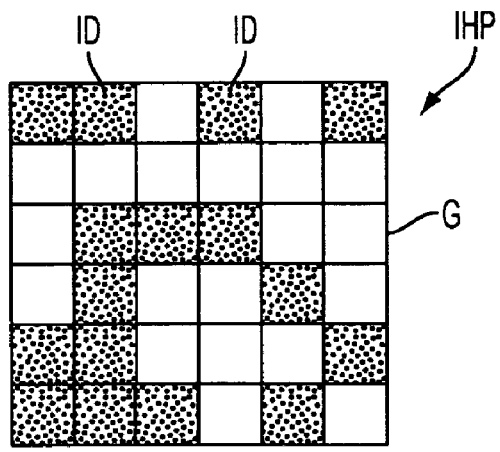
FIG. 2A illustrates an ideal non-overlapping printer model for halftone patterns.
Figure 2B:
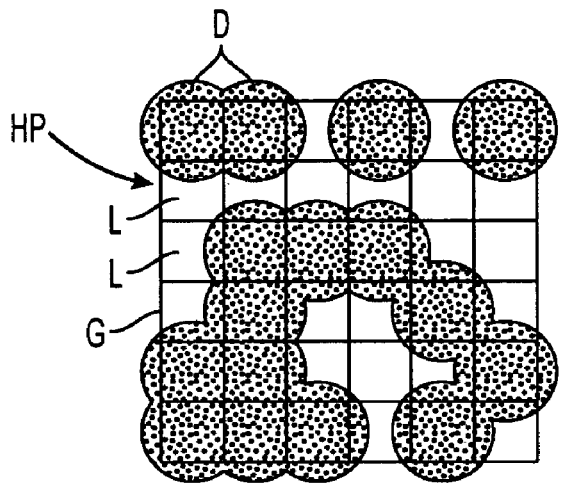
FIG. 2B illustrates a conventional overlapping circular dot printer model for halftone patterns.
Figure 2C:
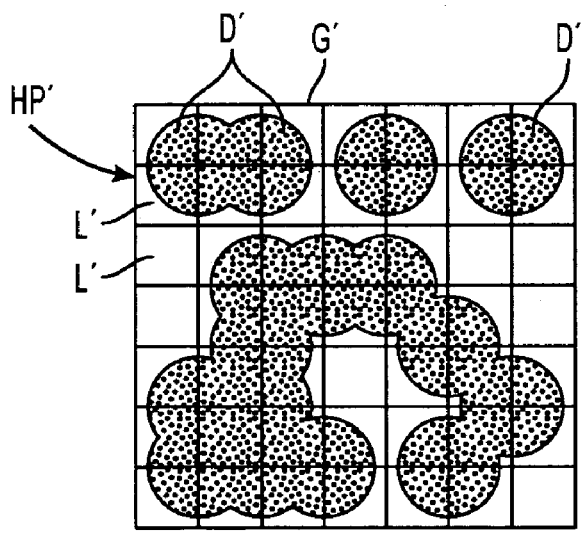
FIG. 2C illustrates a 2×2 printer model for halftone patterns.
Figure 2D:
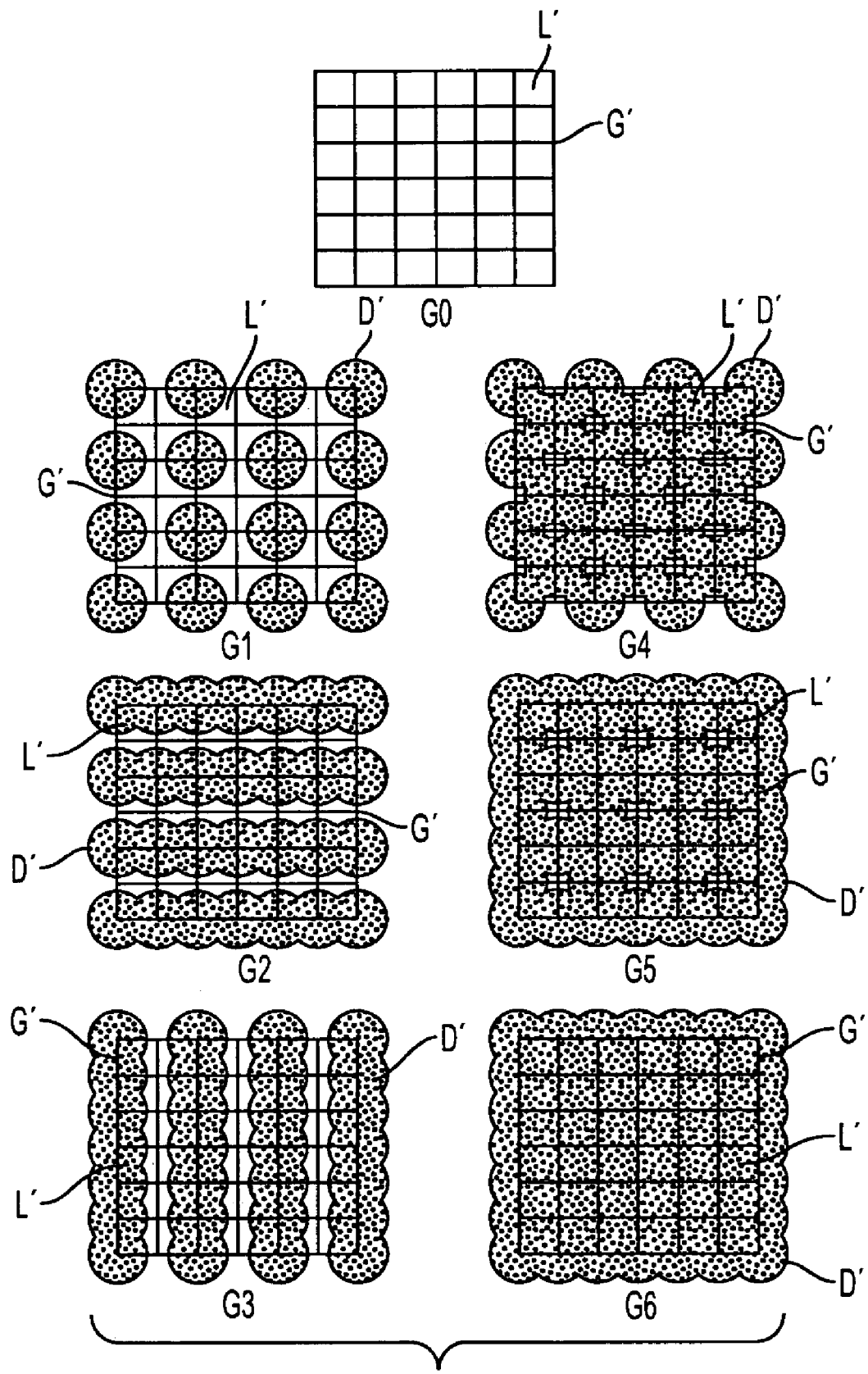
FIG. 2D illustrates seven 2×2 patterns that account for all of the 16 possible overlapping printer output dots in the 2×2 printer model.
Figure 2E:
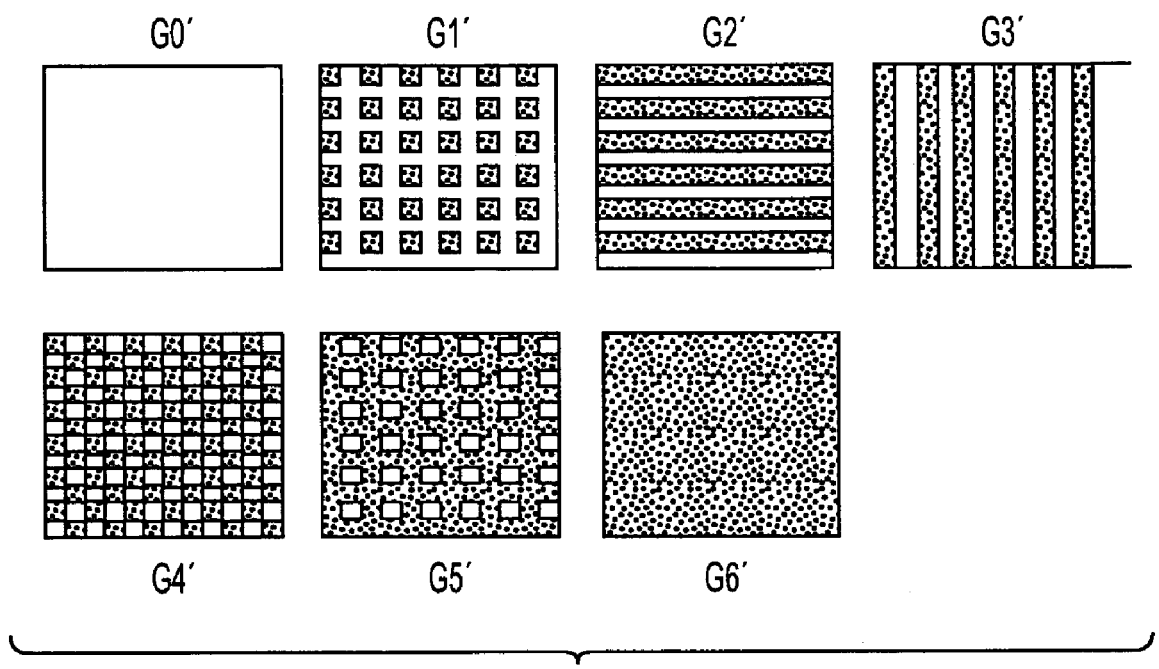
FIG. 2E illustrates one example of real-world representations or "test patches" for the seven 2×2 patterns of FIG. 2D.
Figure 4:
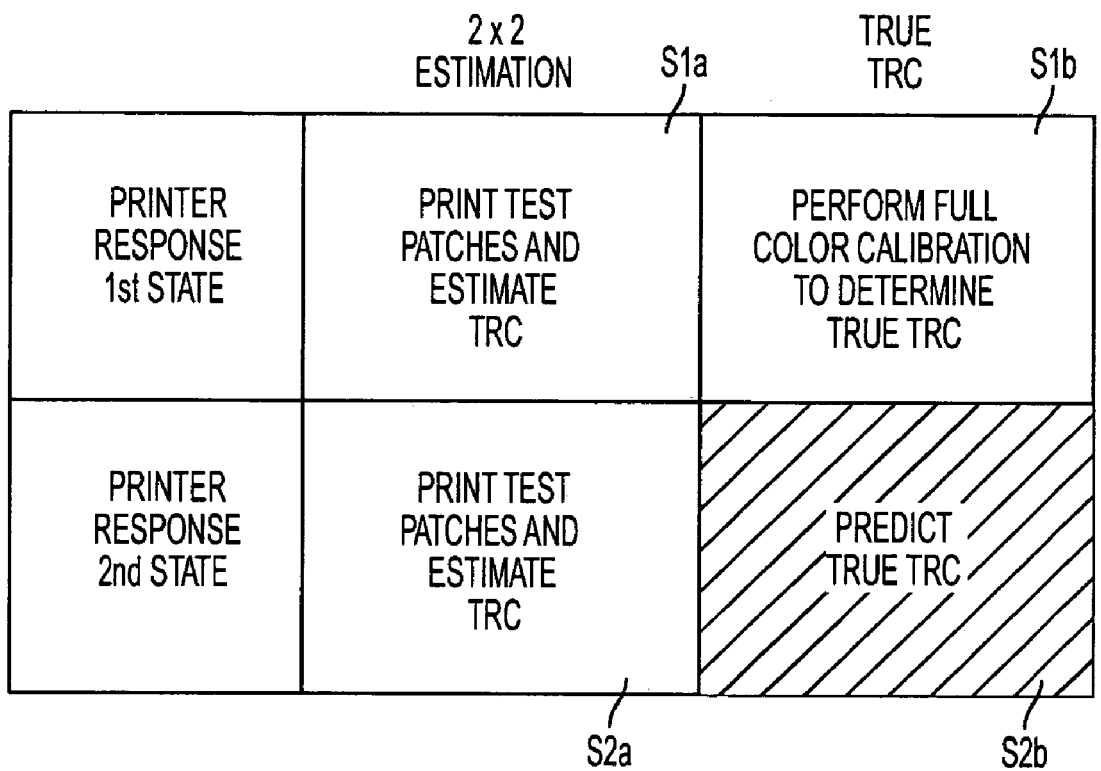
FIG. 4 graphically illustrates a method for halftone independent correction of temporal or media color drift.

The present development is summarized with reference to FIG. 4. The printer color response in a first state is determined for each output color channel, e.g., cyan, magenta, yellow, black, using two different methods for each color channel:

(i) in a step S1a, printing the seven 2×2 test patches G0'-G6' (or other forms respectively representative of the patterns G0-G6 shown in FIG. 2D) and using a color sensor to measure the color of the patches G0'-G6' for each color channel. These color measurements are referred to herein as "2×2 data" for the first state of the printer. It should be noted that the white patch G0' need only be printed and measured once because its color is the same for each color channel); and, (ii) in a step S1b, performing a full color calibration to obtain a "true TRC" for the first state of the printer using color sensors, for each halftone screen (method) and for each color channel, as is known in the art (which typically requires printing and measuring the color of hundreds of different patterns and is time consuming).

For a second state of the printer (e.g., at a later time or using a different paper) the seven 2×2 test patches G0'-G6' are printed for each color channel again (again, the white patch G0' need be printed only once) in a step S2a. The 2×2 test patches are printed in the same form as earlier printed for the first printer state, e.g., in the form of the patches G0'-G6', to eliminate a possibility for color measurement variation resulting from use of a different style of test patches. The color of the 2×2 patches G0'-G6' is again measured using the color sensors, also in the step S2a. With the color data acquired for the first printer state (both the 2×2 data and the true TRC data), and with the 2×2 data acquired for the second printer state, the true TRC for the second printer state (represented by the shaded block of FIG. 4) for each color channel is able to be predicted in a step S2b, as indicated in the shaded block and as described in full detail below.

Figure 5A:
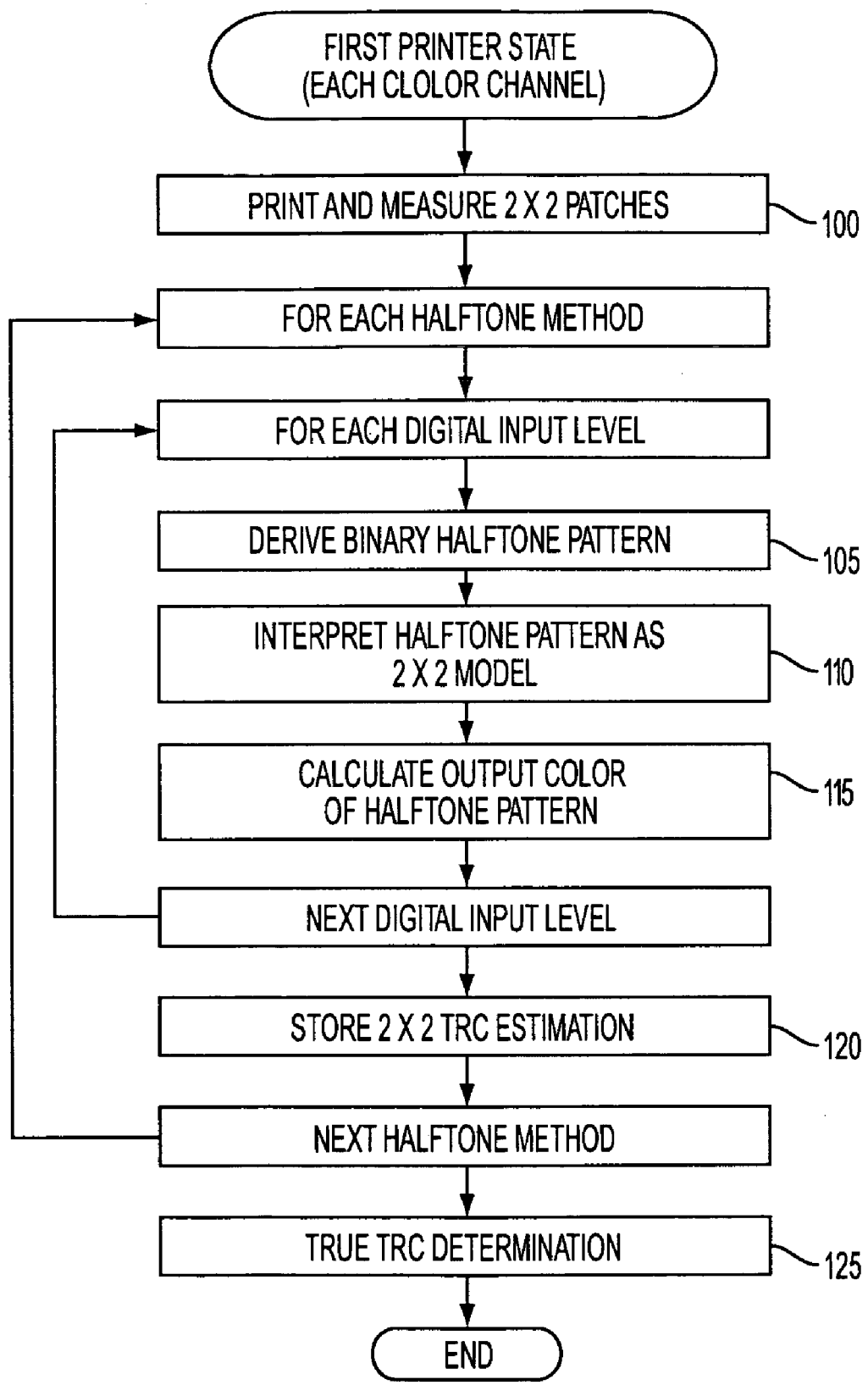
FIG. 5A is a flow chart that discloses a first part of a method for halftone independent color drift correction in accordance with the present development.
Figure 5B:
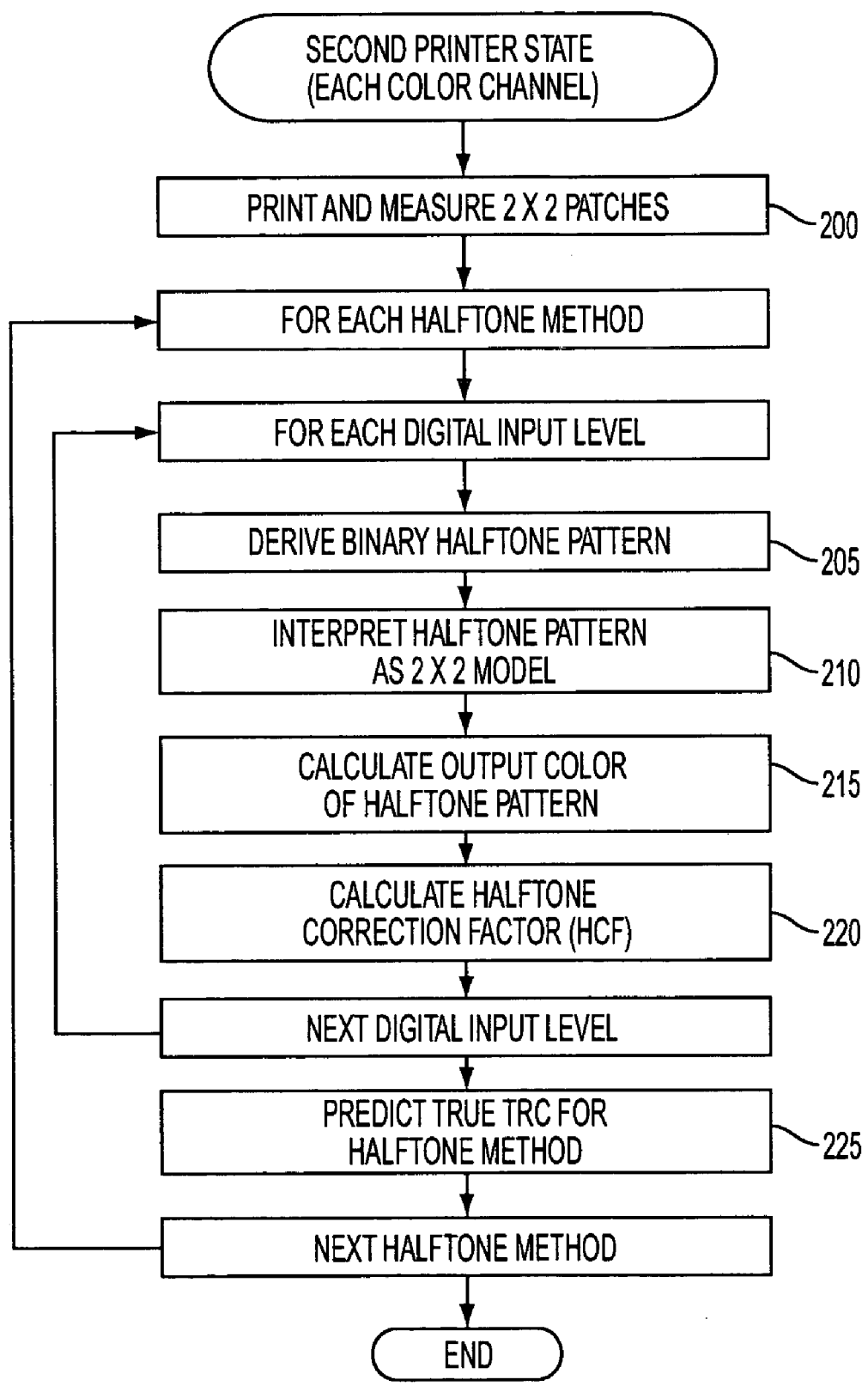
FIG. 5B is a flow chart that discloses a second part of a method for halftone independent color drift correction in accordance with the present development.

FIGS. 5A, 5B disclose the process in further detail. FIG. 5A discloses the processes carried out for the first printer state, e.g., at a first time T1 or for a first printing medium M1, while FIG. 5B discloses the processes carried out for the second printer state, e.g., at a second time T2 or for a second printing medium M2. Those of ordinary skill in the art will recognize that some of the processes set forth in FIGS. 5A and 5B can be carried out in an order that is different that that shown in the drawing. It is not intended that the present development be limited to the exact embodiment shown in the drawings.

Figure 3:
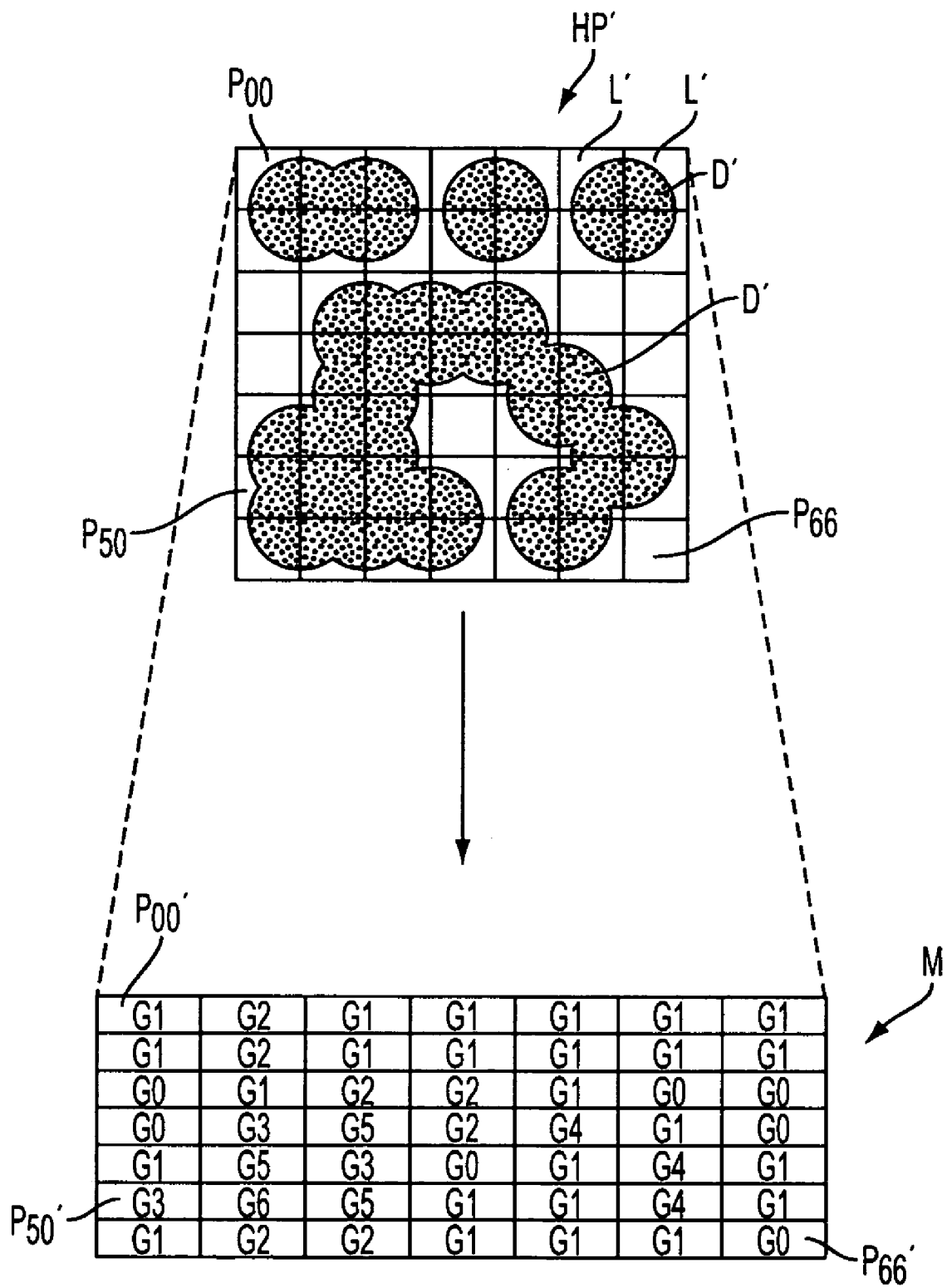
FIG. 3 illustrates an example of modeling a binary (halftone) pattern using a select plurality of the seven 2×2 patterns of FIG. 2D.

As shown in FIG. 5A, for a first printer state and for each color channel, the process comprises printing and measuring the 2×2 patches G0'-G6' (all seven patches, if needed, or only six patches if the white patch G0' was previously printed and measured for a different color channel) in a step 100. Then, for each possible halftone method of the printer, and for a plurality of (preferably all possible) digital input levels for the color channel (e.g., 0-255 for an eight bit color depth system), the binary halftone output pattern for the digital input level is derived (not printed) in a step 105 and the 2×2 printer model is used in a step 110 to interpret or model the binary output pattern as a grouping M of the 2×2 patterns G0-G6 as described above with reference to FIG. 3. The 2×2 model M of the binary output pattern, together with the known color measurement of the 2×2 test patches G0'-G6' which respectively represent the 2×2 patterns G0-G6, allows the average output color of the binary halftone output pattern for each of the corresponding digital input levels to be calculated in a step 115 according to the Neugebauer equation as described above:

$$G_{AVG}^{1/\gamma} = \sum_{i=0}^{6} n_i G_i^{1/\gamma}$$

where $G_i$, i=0 to 6 is the measured gray level of the respective 2×2 test patches G0'-G6', $n_i$ is the number of pixels of the corresponding 2×2 pattern G0-G6 in the given binary pattern, and γ is the Yule-Nielsen factor. Typical values for γ that offer acceptable fits to measurement data range from 2 to 4. This process is repeated for all possible digital input levels for the color channel (or optionally a subset of all possible digital input levels) and for all halftone methods/screens for each color channel (typically cyan (C), magenta (M), yellow (Y), black (K)). The calculated average output colors of the binary halftone output patterns corresponding to the digital input levels define a 2×2 estimation of the TRC for each color channel, and the data are stored for later use in a step 120.

Also for the first printer state, true TRCs for each color channel and for each halftone method are derived in a step 125, using conventional methods of printing and measuring the color of the binary output for numerous (sometimes all possible) digital input color levels for all different halftone methods and for each color channel. The data defining these true TRCs for the first printer state are also stored.

For a second printer state, e.g., at a second time T2 later than the time T1 and/or for a second printing medium M2 that is different from the printing medium M1), a process in accordance with that shown in FIG. 5B is carried out to predict a true TRC for each color channel for the second state of the printer, without performing full color calibration to obtain the true TRCs. In particular, in a step 200, for each color channel, the 2×2 test patches G0'-G6' are printed and the color of these test patches is measured (typically the white patch is printed and measured for only one of the color channels). For each possible halftone method/screen of the printer and for a plurality of different digital input color levels, preferably all possible digital input color levels (e.g., 0-255 for an eight bit system), the binary halftone pattern corresponding to the digital input color level is derived (but need not be printed) in a step 205 and, in a step 210, the binary halftone pattern is interpreted according to the 2×2 model as a combination/model M of the 2×2 patterns G0-G6. In a step 215, the average color of each binary halftone pattern is then calculated according to the Neugebauer equation with the Yule-Nielsen modification, as follows:

$$G_{AVG}^{1/\gamma} = \sum_{i=0}^{6} n_i G_i^{1/\gamma}$$

where $G_i$, i=0 to 6 is the measured gray level of the respective 2×2 test patches G0'-G6', $n_i$ is the number of pixels of the corresponding 2×2 pattern G0-G6 in the given binary pattern, and γ is the Yule-Nielsen factor. The calculated average output colors of the binary halftone output patterns corresponding to the digital input levels define a 2×2 estimation of the TRC for each color channel for the second state of the printer. In a step 220, a halftone correction factor (HCF) is then calculated for the second printer state at each digital input color level. The HCF is preferably calculated as either: (i) the difference (or ratio) between the 2×2 TRC estimations for the first and second printer states; or, (ii) the difference (or ratio) between the true TRC for the first printer state and the corresponding 2×2 TRC estimation for the first printer state. The above process is repeated for all halftone methods of the printer.

The respective true TRCs for all halftone methods and for all color channels for the second printer state (e.g., at time T2 or for media M2) are then predicted in a step 225. In general, each true TRC for the first printer state is adjusted for each digital input color level by applying the halftone correction factor (HCF) thereto, either additively if the halftone correction factor HCF is expressed as a difference (delta) or multiplicatively if the halftone correction factor HCF is expressed as a ratio as described above, so that a new true TRC is predicted for the second printer state. In other words, the color drift indicated by the halftone correction factor (HCF) is used to adjust the true TRC for the first printer state to predict the true TRC for the second printer state.

The above described relationships can be described as:

$$\frac{TRC_{true}, \text{1st State}(d, i, H)}{TRC_{2\times 2}, \text{1st State}(d, i, H)} \approx \frac{TRC_{true}, \text{2nd State}(d, i, H)}{TRC_{2\times 2}, \text{2nd State}(d, i, H)}$$

for i=color channel (e.g., C, M, Y, K); d=digital input level, $0 \leq d \leq d_{max}$; where H represents a particular halftone method, $TRC_{true}$ represents a true TRC and where $TRC_{2\times 2}$ represents a 2×2 estimation of a TRC. This, then, allows the true TRC for the second printer state to be estimated as:

$$TRC_{true}, \text{2nd State}(d, i, H) = \frac{TRC_{true}, \text{1st State}(d, i, H)}{TRC_{2\times 2}, \text{1st State}(d, i, H)} TRC_{2\times 2}, \text{2nd state}(d, i, H)$$

According to the above relationship, the halftone correction factor ratio can be expressed as the ratio:

$$HCF = \frac{TRC_{true}, \text{1st State}(d, i, H)}{TRC_{2\times 2}, \text{1st State}(d, i, H)}$$

Figure 5C:
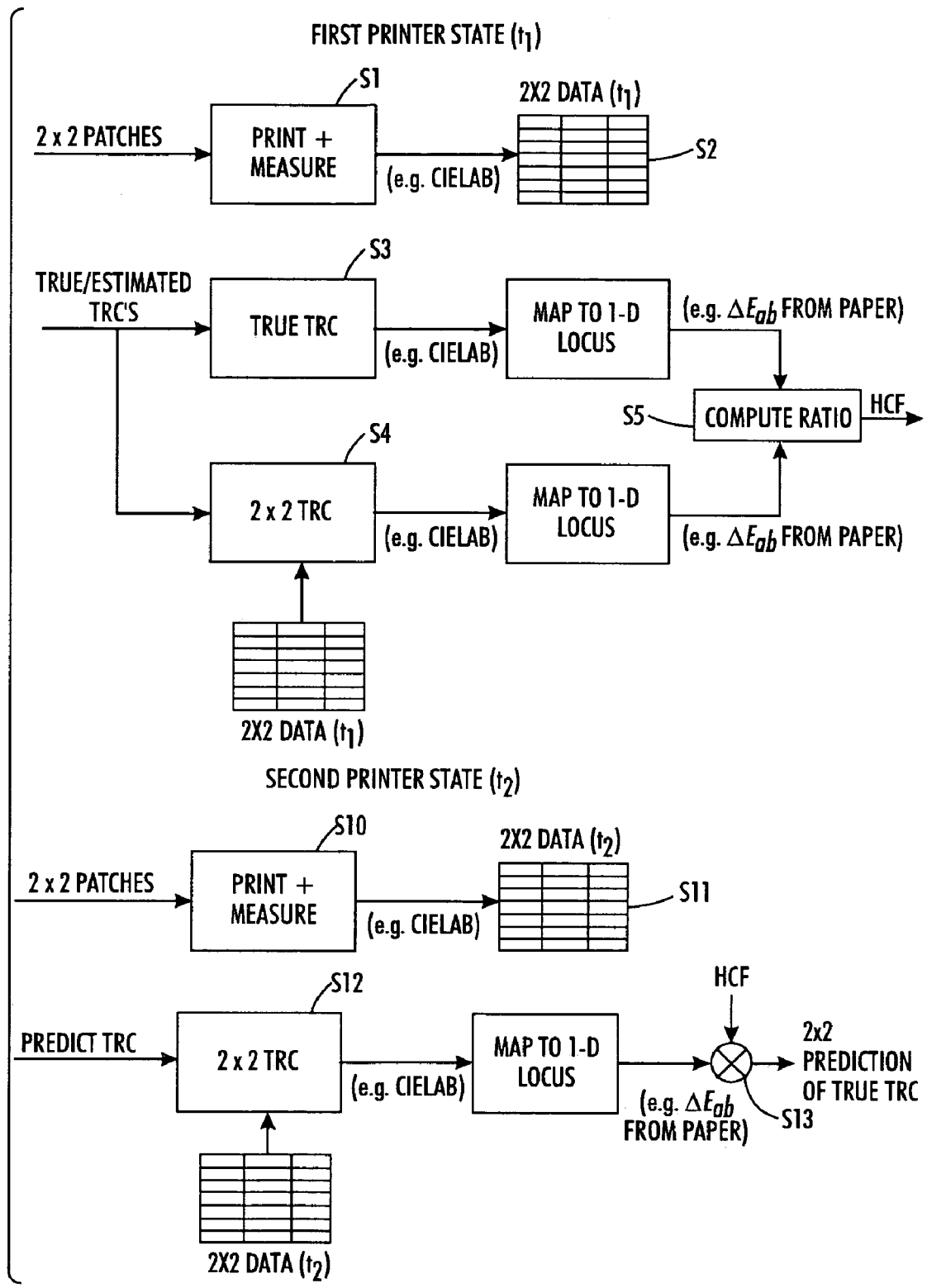
FIG. 5C illustrates one example of a color correction process in accordance with the present development.

FIG. 5C provides a diagrammatic illustration of the color drift correction process of the present development. In FIG. 5C, it can be seen that for the first printer state, the seven 2×2 patches are printed and measured for color in step S1, and the results (e.g., as CIELab data) are stored at S2. Also for the first printer state, a true TRC for each color channel is derived and stored as described above and as shown at S3. Finally, a 2×2 estimation for the TRC for each color channel is derived and stored as shown at S4, using the 2×2 data stored at S2. In a step S5, the true TRC data and 2×2-estimated TRC data are used to derive the halftone correction factor (HCF) as described above, which requires mapping each digital input colorant value to a 1-dimensional measurement or locus of printed color (e.g., a color difference $\Delta E_{ab}$ between the printed color and the color of the bare substrate) so that the halftone correction factor HCF ratio can be calculated as set forth above.

With continuing reference to FIG. 5C, for the second (drifted) printer state, the step S10 is carried out to print and measure the color of the seven 2×2 patches again, for each color channel, and the results are stored as shown at S11. These 2×2 test patch results from S11 are used as input for the 2×2 TRC estimation process step S12 described in connection with FIG. 5B to derive and store a 2×2 estimation of the TRC for each color channel. The 2×2-estimated TRC data are mapped to a 1-dimensional measurement (locus) of printed color (e.g., a color difference $\Delta E_{ab}$ between the printed color and the color of the bare substrate) so that, in a step S13, the halftone correction factor HCF derived previously can be applied to the 2×2-estimated TRC data to derive a predicted true TRC for each color channel for the second (drifted) state of the printer.

Figure 6:
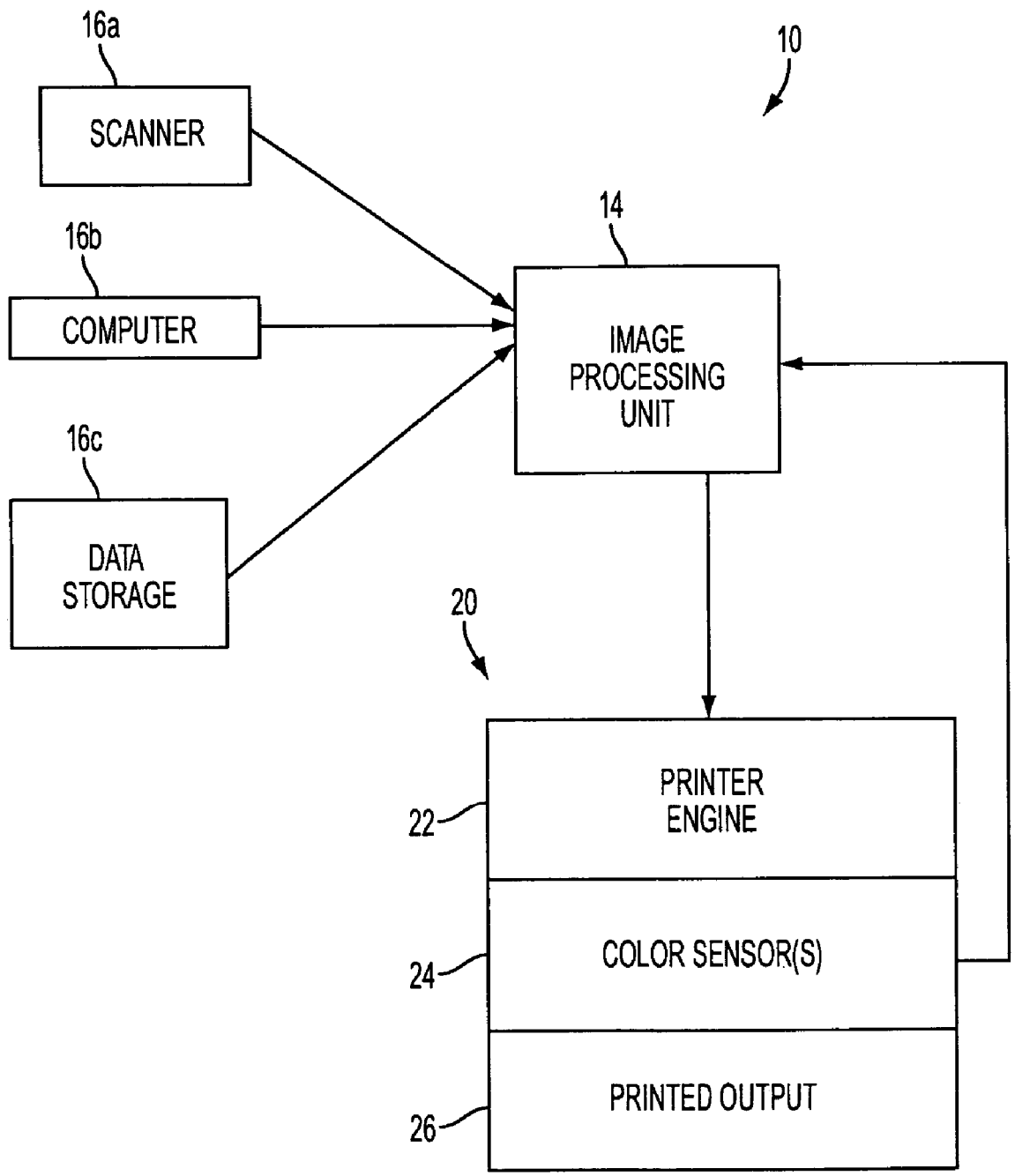
FIG. 6 illustrates one example of an apparatus for implementing a system in accordance with the present development.

The system and/or method of the present development is/are preferably implemented in a printing system such as any commercially available printer, which can be provided as part of a printing and/or reproduction apparatus. Typically, the printer is a xerographic printer although the present development is applicable to other printing methods such as inkjet. FIG. 6 illustrates one example of an apparatus that is suitable for implementing a method and apparatus in accordance with the present development. The apparatus 10 comprises an image processing unit IPU 14 for carrying out the above-described image processing operations. The IPU 14 is defined by electronic circuitry and/or software that is dedicated to image processing or can comprise a general purpose computer programmed to implement the image processing operations disclosed herein. The IPU 14 is adapted to receive image data from a source such as a scanner 16a, computer 16b, and/or data storage 16c or another source that is part of the apparatus 10 and/or that is operably connected to the IPU 14. The apparatus comprises a printing unit 20 comprising a print engine 22 for printing the image data on paper or another printing medium using ink and/or toner as is known in the art, using the CMYK color space. The print unit also comprises one or more in-line (i.e., located along the paper travel path) color sensors 24 for detecting the color of the image printed by the print engine. The one or color sensors are operably connected to the IPU 14 for providing the sensed color data to the IPU as required to implement the above described color drift correction operations. The printer unit 20 further comprises a printed output station 26 for output of the final printed product.

While particular embodiments have been described, alternatives, modifications, variations, improvements, and substantial equivalents that are or may be presently unforeseen may arise to applicants or others skilled in the art. Accordingly, the claims as filed and as they may be amended are intended to embrace all such alternatives, modifications variations, improvements, and substantial equivalents.

The invention claimed is:

1. A method for compensating for color drift in a printer, said method comprising, for each color channel:

determining a first true tone response curve for a color channel when said printer is in a first state;

determining a first estimated tone response curve for the color channel when said printer is in said first state, said first estimated tone response curve different from said first true tone response curve, wherein said step of determining said first estimated tone response curve comprises: (i) using the printer to print a first plurality of different test patches using said color channel when said printer is in said first state and using a color sensor to measure a color of each test patch in said first plurality of test patches to obtain a measured color for each test patch in said first plurality of test patches; (ii) deriving a first plurality of binary halftone patterns for a respective first plurality of digital input color values; (iii) deriving a first model for each of said first plurality of binary halftone patterns, said first model including a group of at least some of said test patches from said first plurality of test patches; (iv) using said measured color of the test patches included in said model to estimate a color output value for each of said first plurality of binary halftone patterns, wherein each color output value is related to one of said first plurality of digital input color values to thereby define said first estimated tone response curve;

determining a second estimated tone response curve for the color channel when said printer is in a second, color-drifted state relative to said first state, wherein said step of estimating said second tone response curve comprises: (i) using said printer to print a second plurality of different test patches using said color channel when said printer is in said second state and using said color sensor to measure a color of each test patch in said second plurality of test patches to obtain a measured color for each test patch in said second plurality of test patches; (ii) deriving a second plurality of binary halftone patterns for a respective second plurality of digital input color values; (iii) deriving a second model for each of said second plurality of binary halftone patterns, said second model including a group of at least some of said test patches from said second plurality of test patches; (iv) using said measured color of the test patches included in said second model to estimate a color output value for each of said second plurality of binary halftone patterns, wherein each color output value is related to one of said second plurality of digital input color values to thereby define said second estimated tone response curve;

mathematically predicting a second true tone response curve for the color channel using said first true tone response curve, said first estimated tone response curve, and said second estimated tone response curve, by adjusting said first true tone response curve using a halftone correction factor derived based upon at least one of: (i) a relationship between said first and second estimated tone response curves; and (ii) a relationship between said first true tone response curve and said first estimated tone response curve.

2. The method as set forth in claim 1, wherein said step of deriving said first plurality of binary halftone patterns and said step of deriving a second plurality of binary halftone patterns comprises deriving said first and second plurality of halftone patterns for all possible digital input color values for the color channel, wherein said first and second plurality of binary halftone patterns are identical.

3. The method as set forth in claim 1, wherein:

each of said first plurality of binary halftone patterns is defined by a plurality of first pixels each exhibiting a first color coverage, wherein each test patch of said first plurality of test patches corresponds to a particular level of said first color coverage;

said step of deriving said first model comprises, for each of said first plurality of binary halftone patterns, associating each of said first pixels with one of said first plurality of test patches based upon said color coverage of said first pixel;

and wherein:

each of said second plurality of binary halftone patterns is defined by a plurality of second pixels each exhibiting a second color coverage, wherein each test patch of said second plurality of test patches corresponds to a particular level of said second color coverage;

said step of deriving said second model comprises, for each of said second plurality of binary halftone patterns, associating each of said second pixels with one of said second plurality of test patches based upon said color coverage of said second pixel.

4. The method as set forth in claim 3, wherein:

the color output value for each of said first and second plurality of binary halftone patterns is calculated according to the Neugebauer equation with the Yule-Nielsen modification, as follows:

$$G_{AVG}^{1/\gamma} = \sum_{i=0}^{6} n_i G_i^{1/\gamma}$$

where $G_i$, i=0 to 6 is the respective measured color levels of seven test patches included in said first and second plurality of test patches, $n_i$ is the number of the corresponding test patches included in said first and second models, and γ is the Yule-Nielsen factor.

5. The method as set forth in claim 1, wherein said steps of: (i) determining the first true tone response curve for the color channel; (ii) determining the first estimated tone response curve for the color channel; (iii) determining the second estimated tone response curve for the color channel; and (iv) mathematically predicting the second true tone response curve for the color channel; are repeated for a plurality of different halftone methods to predict a plurality of different second true tone response curves respectively associated with said plurality of different halftone methods.

6. The method as set forth in claim 1, wherein said halftone correction factor is expressed as a difference value that is added to or subtracted from said first true tone response curve.

7. The method as set forth in claim 1, wherein said halftone correction factor is expressed as s ratio that is multiplied with said first true tone response curve.

8. The method as set forth in claim 1, wherein said first and second different states of said printer represent either: (i) first and second temporal states of said printer; or (ii) first and second different printing media used in said printer.

9. A xerographic printing apparatus comprising:
an image processing unit adapted to receive image data from a source;
a printing unit comprising a print engine for printing the image data to define a printed image;
a color sensor for detecting a color of the printed image printed by the print engine, said color sensor operably connected to the image processing unit to input said color of said printed image to the image processing unit;
a printed output station for output of the printed image;
wherein said image processing unit comprises means for compensating for color drift in said printing apparatus when said printing apparatus changes from a first state to a second state, said means for compensating for color drift comprising:
means for determining a first true tone response curve for a color channel of said printing apparatus when said printing apparatus is in said first state;
means for determining a first estimated tone response curve for the color channel when said printing apparatus is in said first state, wherein said first estimated tone response curve is different than said first true tone response curve;
means for determining a second estimated tone response curve for the color channel when said printing apparatus is in said second state, wherein said second estimated tone response curve is different than both said first true tone response curve and said first estimated tone response curve;
means for calculating a predicted second true tone response curve for the color channel using said first true tone response curve, said first estimated tone response curve, and said second estimated tone response curve, said means for calculating said predicted second true tone response curve adjusting said first true tone response curve using a halftone correction factor derived based upon at least one of: (i) a relationship between said first and second estimated tone response curves; and (ii) a relationship between said first true tone response curve and said first estimated tone response curve.

10. A method for color drift correction in a printing device, said method comprising:

determining a true tone response curve for at least one color channel for a first state of said printing device;
using said printing device to print a first plurality of test patches using said at least one color channel when said printing device is in said first state;
measuring a first color output for each of said first plurality of test patches;
deriving a first plurality of different binary output patterns corresponding respectively to a first plurality of different digital input color levels;
for each of said first plurality of binary output patterns, deriving a first model comprising a combination of test patches selected from said first plurality of test patches;
for each first model, calculating an average color output based upon said measured first color output for the test patches from said first plurality of test patches included in said first model;
using said average output color calculated for each of said first models to derive a first estimated tone response curve for said at least one color channel;
using said printing device to print a second plurality of test patches using said at least one color channel when said printer device is in a second state that is different from said first state;
measuring a second color output for each of said second plurality of test patches;
deriving a second plurality of different binary output patterns corresponding respectively to a second plurality of different digital input color levels;
for each of said second plurality of binary output patterns, deriving a second model comprising a combination of test patches selected from said second plurality of test patches;
for each second model, calculating an average color output based upon said measured color output for the test patches of said second plurality of test patches included in said second model;
using said average output color calculated for each of said second models to derive a second estimated tone response curve for said at least one color channel;
deriving a second true tone response curve for said at least one color channel using said first and second estimated tone response curves and said first true tone response curve.

11. The method for color drift correction as set forth in claim 10, wherein said second true tone response curve derived by a method comprising determining a difference between said first and second estimated tone response curves and adjusting said first true tone response curve based upon said difference.

12. The method for color drift correction as set forth in claim 10, wherein said second true tone response curve derived by a method comprising determining a ratio of said first true tone response curve to said first estimated tone response curve and deriving said second true tone response curve such that said ratio is preserved between said second true tone response curve and said second estimated tone response curve.

13. The method as set forth in claim 10, wherein said first plurality of different digital input color levels used in said step of deriving a first plurality of different binary output patterns comprise all possible digital input color levels for said at least one color channel.

14. The method as set forth in claim 13, wherein said second plurality of different digital input color levels used in said step of deriving a second plurality of different binary output patterns comprise all possible digital input color levels for said at least one color channel.

15. The method as set forth in claim 10, wherein said at least one color channel comprises four color channels including cyan, magenta, yellow, and black.

16. The method as set forth in claim 15, wherein said first and second plurality of test patches each comprise seven test patches.

17. The method as set forth in claim 16, wherein said first plurality of test patches comprises a white test patch, and wherein said white test patch is printed only once and the first color output thereof measured only once for all of said four color channels.

18. The method as set forth in claim 17, wherein said second plurality of test patches comprises a white test patch, and wherein said white test patch is printed only once and the second color output thereof measured only once for all of said four color channels.

* * * * *